(12) United States Patent
Sharma et al.

(10) Patent No.: US 11,506,913 B1
(45) Date of Patent: Nov. 22, 2022

(54) HYBRID PLASTIC-GLASS LENS

(71) Applicant: Meta Platforms Technologies, LLC, Menlo Park, CA (US)

(72) Inventors: Robin Sharma, Redmond, WA (US); Kurt Allen Jenkins, Sammamish, WA (US); Karol Constantine Hatzilias, Kenmore, WA (US); Christopher Yuan-Ting Liao, Seattle, WA (US); Alexander Randon Cope, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/940,120

(22) Filed: Jul. 27, 2020

Related U.S. Application Data

(60) Provisional application No. 63/003,643, filed on Apr. 1, 2020.

(51) Int. Cl.
*G02C 7/02* (2006.01)

(52) U.S. Cl.
CPC ............ *G02C 7/02* (2013.01); *G02C 2202/16* (2013.01)

(58) Field of Classification Search
CPC ......... G02C 7/02; G02C 2202/16; G02C 7/04
USPC .................... 351/159.62, 159.02, 159.23
See application file for complete search history.

(56) References Cited

U.S. PATENT DOCUMENTS

| | | | | |
|---|---|---|---|---|
| 4,268,134 | A * | 5/1981 | Gulati | G02C 7/102 |
| | | | | 351/159.62 |
| 4,679,918 | A * | 7/1987 | Ace | G02C 7/02 |
| | | | | 351/159.62 |
| 11,112,622 | B2 | 9/2021 | Coppa | |
| 2015/0131047 | A1 | 5/2015 | Sayor et al. | |
| 2017/0139230 | A1 * | 5/2017 | Ambler | G02C 7/022 |

* cited by examiner

*Primary Examiner* — Darryl J Collins
*Assistant Examiner* — Matthew Y Lee
(74) *Attorney, Agent, or Firm* — Freestone Intellectual Property Law PLLC; Aaron J. Visbeek

(57) ABSTRACT

An optical element includes a glass substrate layer and an optical plastic layer. The optical plastic layer has a planar surface. A prescription surface may be formed in the optical plastic layer opposite the planar surface.

12 Claims, 10 Drawing Sheets

899

HYBRID PLASTIC-GLASS LENS

CROSS-REFERENCE TO RELATED APPLICATIONS

This application claims priority to U.S. provisional Application No. 63/003,643 filed Apr. 1, 2020, which is hereby incorporated by reference.

BACKGROUND INFORMATION

Prescription lenses were traditionally fabricated out of glass before transitioning to predominantly plastic lenses. The conventional manufacturing technique for prescription lenses is to form a prescription surface specific to an individual from a plastic blank that has a base curve. This technique works well for fabricating traditional eye glasses, although the thickness and weight of traditional prescription lenses constrain design, in some contexts.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
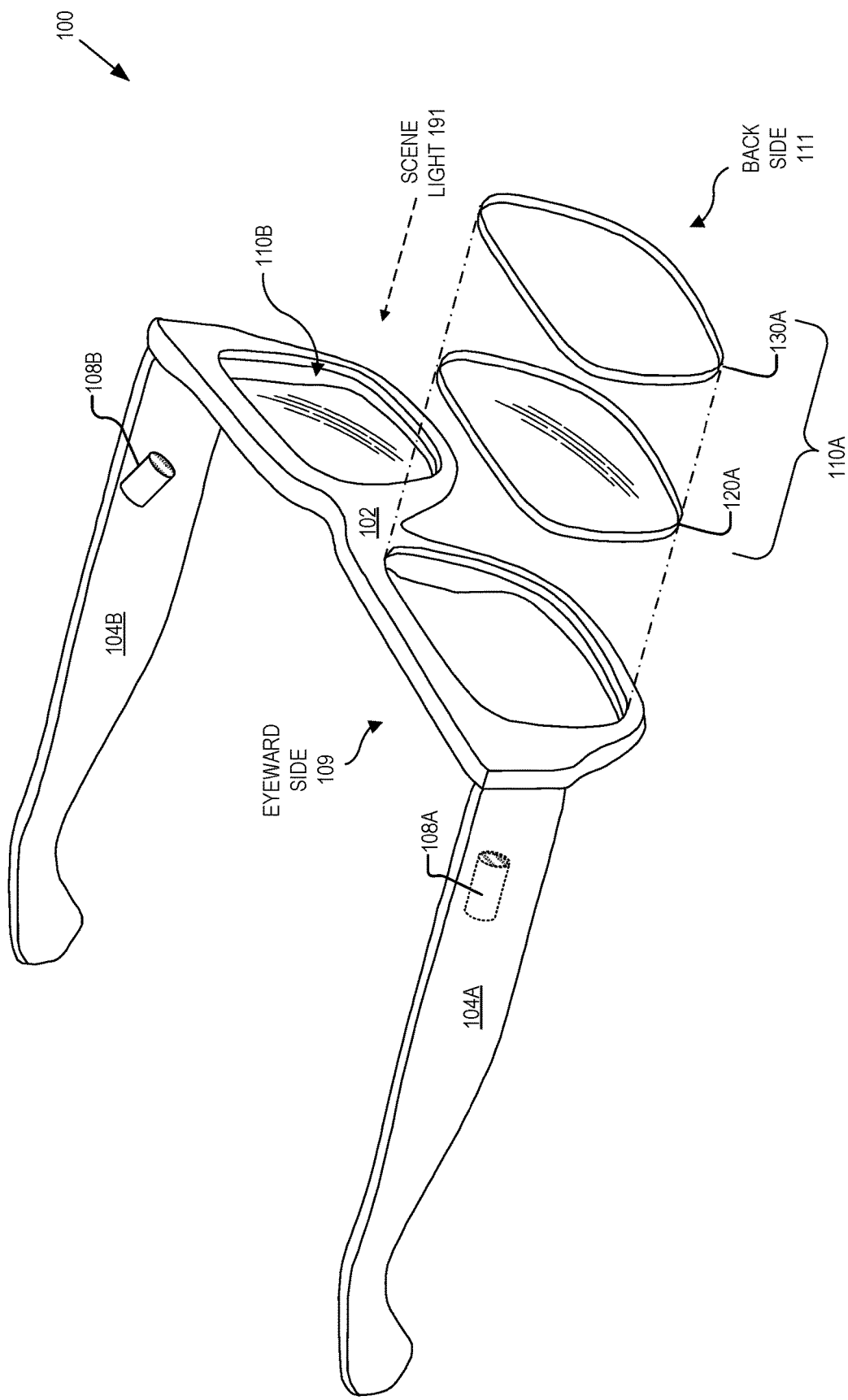
FIG. 1 illustrates an example head-mounted device having a prescription optical element, in accordance with aspects of the present disclosure.

Embodiments of a hybrid plastic-glass lens are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise.

Aspects of this disclosure are directed to lenses and prescription lenses. The disclosed prescription lenses may be incorporated into a head-mounted device (e.g., augmented-reality glasses, virtual reality headset, electronic glasses, or non-electronic eye glasses). In some aspects, the lenses for an AR system may have the following constraints: (1) one surface that is plano for mating with additional optical elements of the optical assembly (e.g., an eye-tracking optical stack) and the other surface should be curved (e.g., concave) for providing the optical power; (2) a size and weight requirement that are more stringent as compared to typical eyewear (e.g., center thickness being less than 0.5 mm and total weight being less than 1 g); (3) little to no lens deformation; and (4) compliance with national or international safety standards. Existing lens blanks are typically made from plastic pucks which are diamond-turned in a lab to a user's specifications. A plastic puck (or blank) with a suitable base curve is selected and then a prescription surface is generated opposite the base curve so that the base curve and the prescription surface combine to provide the prescription optical power specific to the individual. The thinnest prescription lenses that can be made with this approach are limited by the low rigidity of purely plastic substrates. Accordingly, aspects of this disclosure include forming a plastic-glass hybrid lens blank which can be turned using existing tools.

Thus, a plastic substrate may be formed over a glass substrate to form the hybrid plastic-glass hybrid lens blank. The plastic substrate may be cast, molded, laminated, or bonded to the glass substrate. To prevent separation of the two layers, some aspects may include a coefficient of thermal expansion (CTE) layer between the glass and plastic due to the material's differing thermal expansions. The glass base provides rigidity and mechanical support, while the plastic substrate allows for flexible surface shapes that may be formed through diamond turning. In some aspects, the hybrid plastic-glass lens blank are fabricated to have a 500 um or less center thickness.

FIG. 1 illustrates an example head-mounted device 100, in accordance with aspects of the present disclosure. The illustrated example of head-mounted device 100 is shown as including a frame 102, temple arms 104A and 104B, and near-eye optical elements 110A and 110B. Optional eye-tracking cameras 108A and 108B are shown as coupled to temple arms 104A and 104B, respectively. FIG. 1 also illustrates an exploded view of an example of near-eye optical element 110A. Near-eye optical element 110A is shown as including a prescription (Rx) lens 120A, and at least one additional optical element 130A. In some aspects, optical element 130A may include one or more components for eye-tracking purposes, such as in-field light sources, an optical combiner, etc. In an embodiment, optical element 130A includes a plastic layer configured to illuminate an eyebox area with near-infrared light. The plastic layer of optical element 130A may be configured to direct reflected near-infrared light to camera 108A where the reflected near-infrared light is reflected from an eyebox area (e.g. a user's eye, brow, and/or cheek). The optical element 130A may also include a display layer such as a waveguide that is configured to direct virtual images to an eye of a user of head-mounted device 100. There may be an airgap between lens 120A and optical element 130A. Lens 120A may be bonded to optical element 130A, in other embodiments.

A head-mounted device, such as head-mounted device 100 is one type of head mounted device, typically worn on the head of a user to provide artificial reality content to a user. Artificial reality is a form of reality that has been adjusted in some manner before presentation to the user, which may include, e.g., virtual reality (VR), augmented reality (AR), mixed reality (MR), hybrid reality, or some combination and/or derivative thereof.

As shown in FIG. 1, frame 102 is coupled to temple arms 104A and 104B for securing the head-mounted device 100 to the head of a user. Example head-mounted device 100 may also include supporting hardware incorporated into the frame 102 and/or temple arms 104A and 104B. The hardware of head-mounted device 100 may include any of processing logic, wired and/or wireless data interfaces for sending and receiving data, graphic processors, and one or more memories for storing data and computer-executable instructions. In one example, head-mounted device 100 may be configured to receive wired power and/or may be configured to be powered by one or more batteries. In addition, head-mounted device 100 may be configured to receive wired and/or wireless data including video data.

FIG. 1 illustrates near-eye optical elements 110A and 110B that are configured to be mounted to the frame 102. In some examples, near-eye optical elements 110A and 110B may appear transparent to the user to facilitate augmented reality or mixed reality such that the user can view visible scene light 191 from the environment while also receiving display light directed to their eye(s) by way of a display layer. In further examples, some or all of the near-eye optical elements 110A and 110B may be incorporated into a virtual reality headset where the transparent nature of the near-eye optical elements 110A and 110B allows the user to view an electronic display (e.g., a liquid crystal display (LCD), an organic light emitting diode (OLED) display, a micro-LED display, etc.) incorporated in the virtual reality headset.

The Rx lens 120A is shown as being disposed between the optical element 130A and the eyeward side 109 of the near-eye optical element 110A. The Rx lens 120A may be fabricated in accordance with the embodiments of FIGS. 2A-9.

Figure 2A:
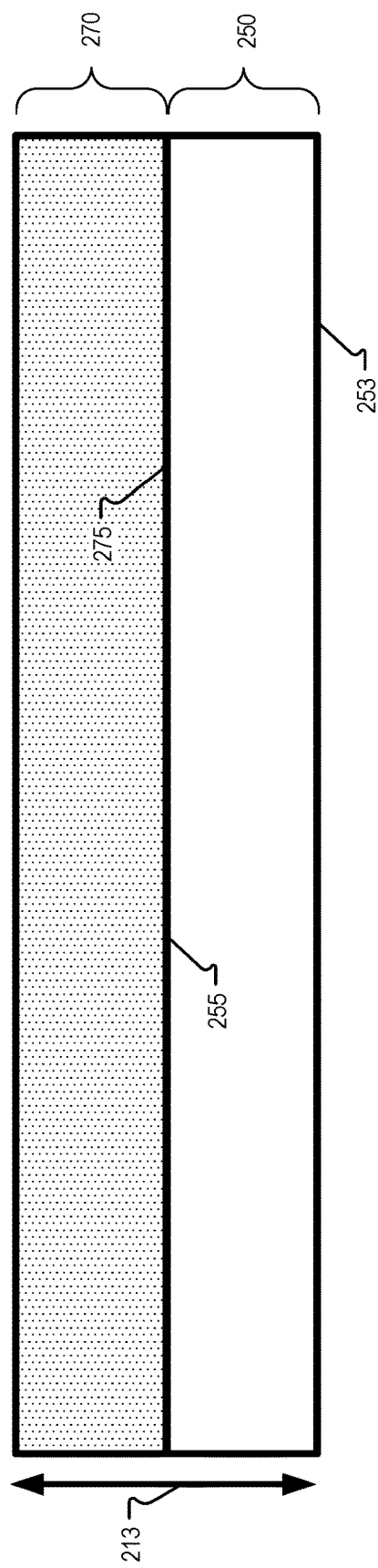
FIG. 2A illustrates a hybrid plastic-glass lens blank that includes an optical plastic substrate coupled to a glass substrate layer, in accordance with an embodiment of the disclosure.

FIG. 2A illustrates a hybrid plastic-glass lens blank 210 that includes an optical plastic layer 270 coupled to a glass substrate layer 250, in accordance with an embodiment of the disclosure. Conventional plastic lens blanks are 3-5 mm thick, whereas the hybrid plastic-glass lens blank 210 may be significantly thinner at dimension 213. A plastic lens blank that was less than 500 microns thick, for example, would not provide the required rigidity for a prescription lens. Hybrid plastic-glass lens blank 210 may have a dimension 213 that is 500 microns or less while providing suitable mechanical rigidity. In FIG. 2A, glass substrate layer 250 provides the rigidity for a prescription lens fabricated from a hybrid plastic-glass lens blank 210. Glass substrate layer 250 coupled to optical plastic layer 270 is rigid and robust enough to survive current environmental and safety tests. In an embodiment, glass substrate layer 250 (when coupled with optical plastic layer 270) is thick enough to withstand 70 Newtons of force. In FIG. 2A, glass substrate layer 250 has a planar surface 253 disposed opposite of another planar surface 255. Glass substrate layer 250 may be less than 400 thick, in some embodiments. Glass substrate layer 250 may be between 200 and 300 microns thick, in some embodiments. Glass substrate layer 250 may be less than 200 microns thick, in some embodiments. In FIG. 2A, glass substrate layer 250 has a planar surface 253.

Optical plastic layer 270 may include acrylate, polyurethane, polycarbonate, or other type of optical plastic layer 270 suitable for prescription lenses. Optical plastic layer 270 has a planar surface 275 that is coupled to a planar surface 255 of glass substrate layer 250, in FIG. 2A. Optical plastic layer 270 may have a first refractive index that is substantially the same as a second refractive index of glass substrate layer 250.

Figure 2B:
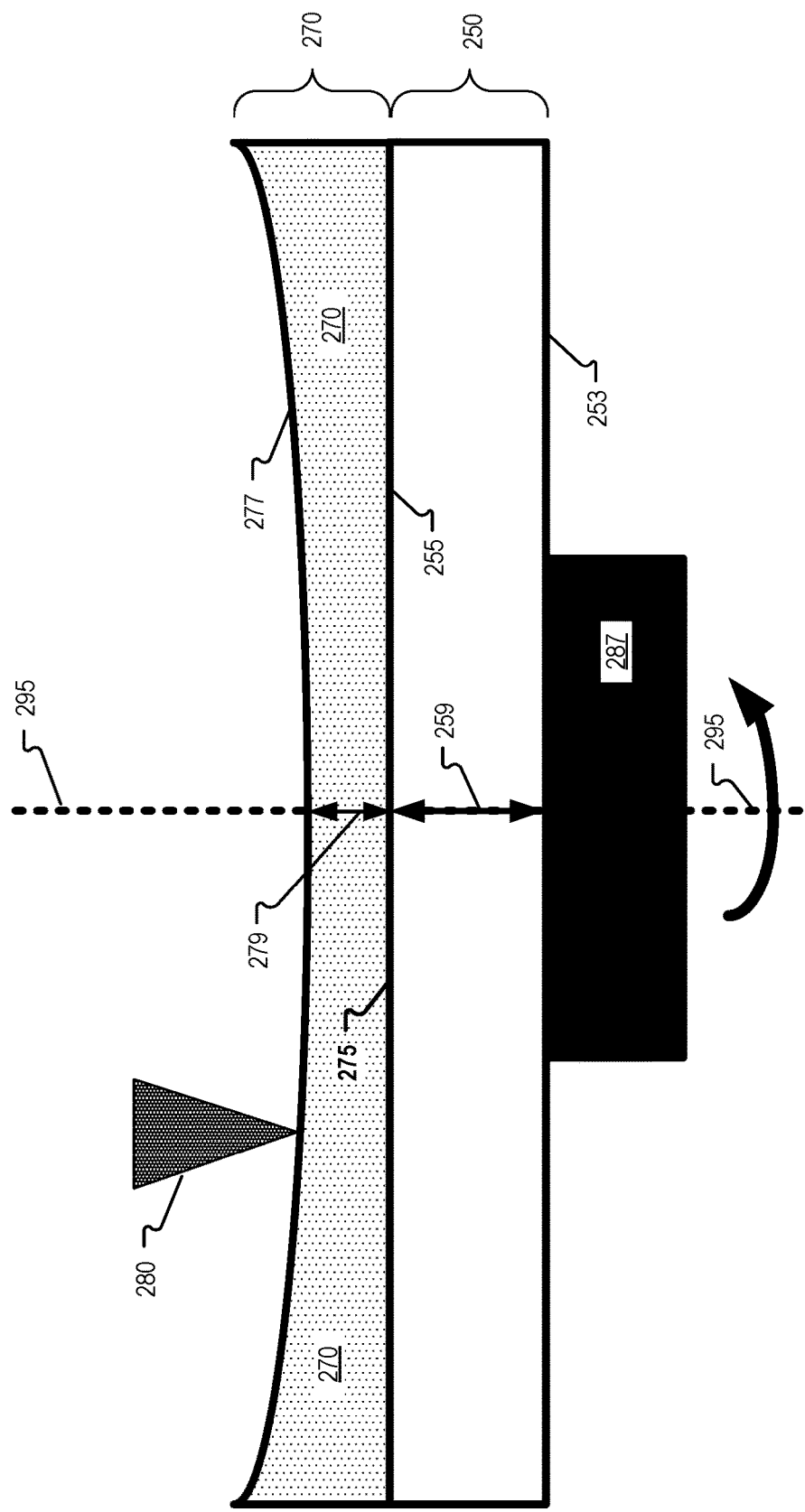
FIG. 2B illustrates forming a prescription surface in a hybrid plastic-glass lens blank to form a prescription lens, in accordance with aspects of the disclosure.

FIG. 2B illustrates forming a prescription surface 277 in hybrid plastic-glass lens blank 210 to form a prescription lens 211, in accordance with aspects of the disclosure. FIG. 2B illustrates chuck 287 securing hybrid plastic-glass lens blank 210 for diamond-turning a prescription surface 277 into the optical plastic layer 270 with a diamond bit 280 in a subtractive process. FIG. 2B illustrates a plastic center thickness dimension 279 of optical plastic layer 270 at a central optical axis 295 of the prescription surface 277. Prescription surface 277 is formed opposite planar surface 275 of optical plastic layer 270. In an embodiment, plastic center thickness dimension 279 is less than 200 microns. Dimension 279 may be less than 100 microns, in some embodiments. In an embodiment, dimension 279 is 50 microns or less. Glass substrate layer 250 may have a thickness 259 of 200 microns or less. A total center thickness of prescription lens 211 (e.g. dimension 279 plus dimension 259) may be less than 500 microns. In a conventional plastic lens, a center thickness that is 500 microns or less would not provide suitable rigidity for the prescription lens. However, the hybrid plastic-glass prescription lens 211 has the benefit of the rigidity characteristic of glass substrate layer 250. This allows prescription lens 211 to be significantly thinner and lighter than conventional lenses. Furthermore, plastic center thickness dimension 279 being 200 microns or less allows for thermal expansion of optical plastic layer 270 that is significantly greater than conventional plastic eye glass lenses. Prescription lens 211 may be used as lens 120 in FIG. 1, for example.

Previous designers have not been motivated to fabricate a hybrid plastic-glass prescription lens because the plastic lenses are light enough for conventional prescription lenses and have become incredibly inexpensive to fabricate. In contrast, the disclosed hybrid plastic-glass lens blanks and prescription lenses may be more costly and more complicated to fabricate due to using a plurality of materials and additional manufacturing process steps. Furthermore, the larger size of the conventional all-plastic prescription lens provides larger mechanical features (e.g. bevel or groove on outside of prescription lens) that may make the prescription lens easier to secure to conventional eye-glasses frames. Yet, in some contexts, reduced thickness and weight of a prescription lens may be particularly beneficial.

Figure 3:
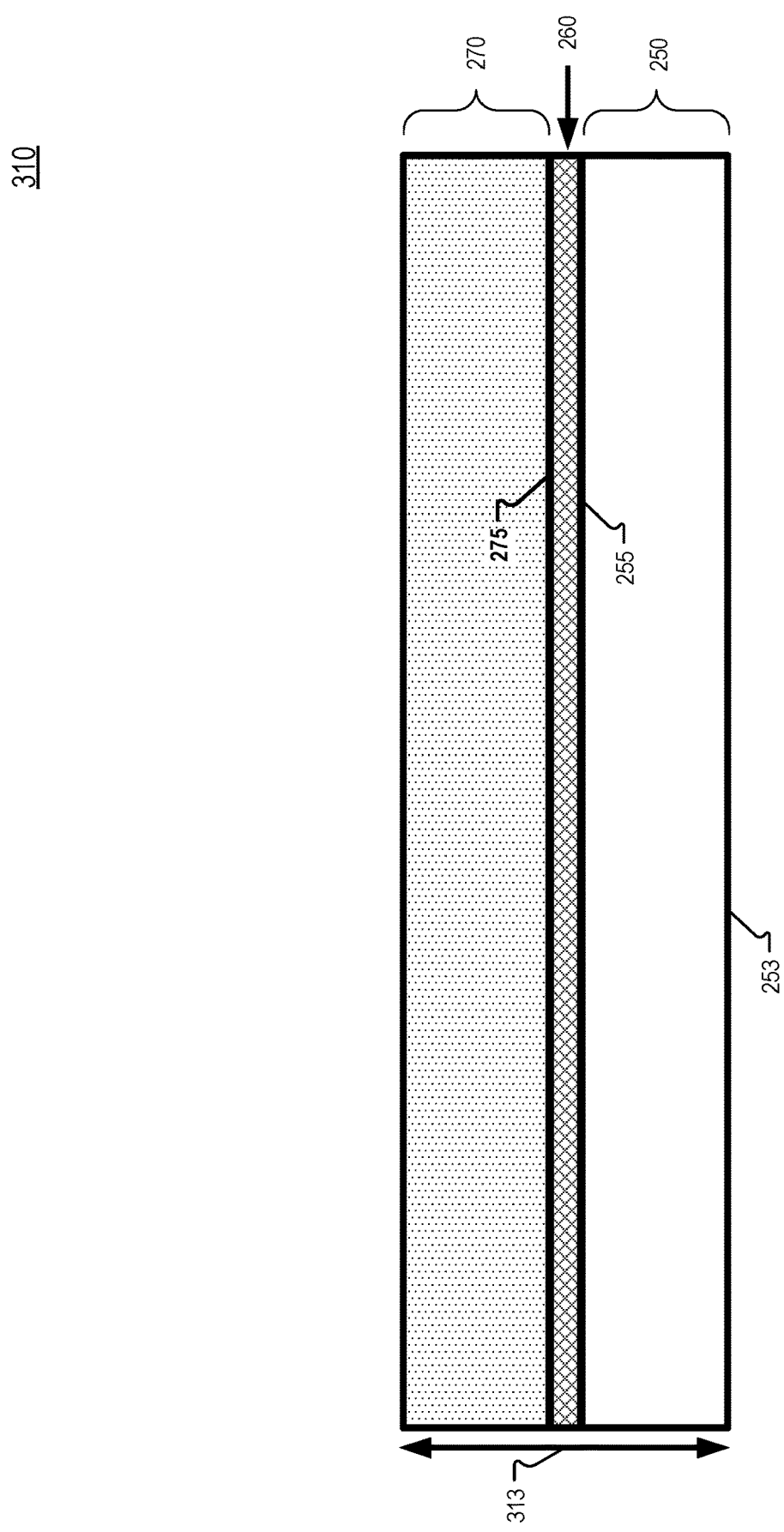
FIG. 3 illustrates a hybrid plastic-glass lens blank that includes an optical plastic layer, a glass substrate layer, and an intermediate layer, in accordance with aspects of the disclosure.

FIG. 3 illustrates a hybrid plastic-glass lens blank 310 that includes optical plastic layer 270, glass substrate layer 250, and an intermediate layer 260, in accordance with an embodiment of the disclosure. Intermediate layer 260 is disposed between optical plastic layer 270 and glass substrate layer 250. Intermediate layer 260 may be an optically clear adhesive (OCA). Intermediate layer 260 may be indexed matched to a refractive index of optical plastic layer 270 and/or glass substrate layer 250. Intermediate layer 260 may adhere glass substrate layer 250 to optical plastic layer 270. Even with intermediate layer 260 added, hybrid plastic-glass lens blank 310 may have a dimension 313 that is less than 1 mm. Hybrid plastic-glass lens blank 310 may have a dimension 313 that is less than 500 microns.

In an embodiment, intermediate layer 260 has a coefficient of thermal expansion (CTE) configured to provide axial flexibility and lateral flexibility of a prescription lens over temperature ranges that will be encountered by the prescription lens. Thus, intermediate layer 260 may be configured as a CTE absorber layer.

Intermediate layer 260 may also be configured as a cushioning layer to absorb at least a portion of mechanical shock that would be transferred between optical plastic layer 270 and glass substrate layer 250. Intermediate layer 260 may be considered a gel or semi-pliable layer that is soft enough to deform without cracking under mechanical and/or thermal stress. A primer may be used as intermediate layer 260. Intermediate layer 260 may be an adhesion promoter that facilitates better adhesion between optical plastic layer 270 and glass substrate layer 250. Intermediate layer 260 may include adhesives that are commonly used to bond a display (e.g. LCD or OLED) with a display coverglass, for example.

Figure 4:
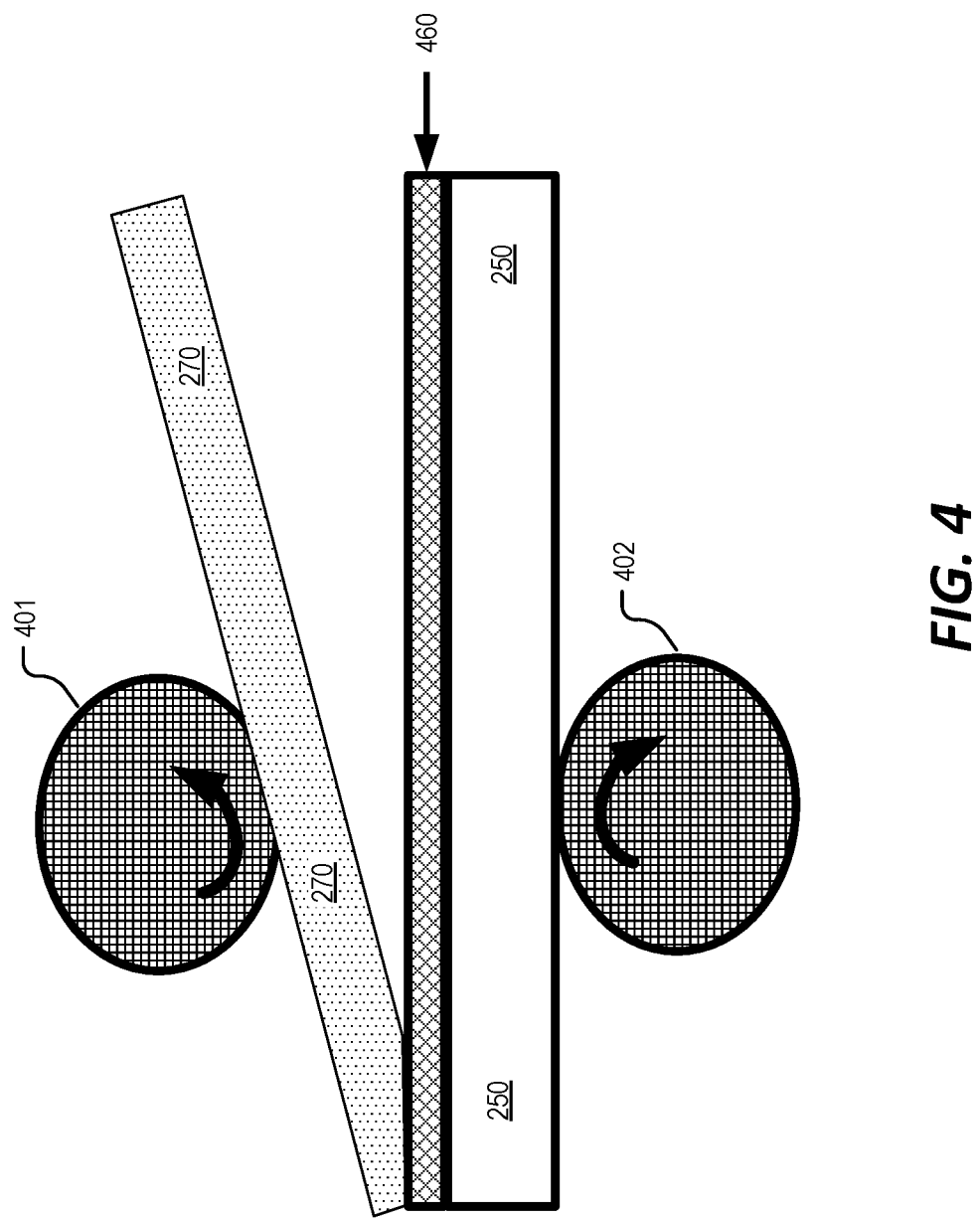
FIG. 4 illustrates an example roll-to-roll bonding of an optical plastic layer to a glass substrate layer, in accordance with aspects of the disclosure.

FIG. 4 illustrates an example roll-to-roll bonding of optical plastic layer 270 to glass substrate layer 250, in accordance with aspects of the disclosure. Roll-to-roll bonding is one example of fabricating a hybrid plastic-glass blank of the disclosure. In FIG. 4, rolls 401 and 501 rotate to roll optical plastic layer 270 onto glass substrate layer to bond optical plastic layer 270 to glass substrate layer 250 with an optically clear adhesive layer 460. Layer 460 may include attributes described in connection with intermediate layer 260.

Figure 5:
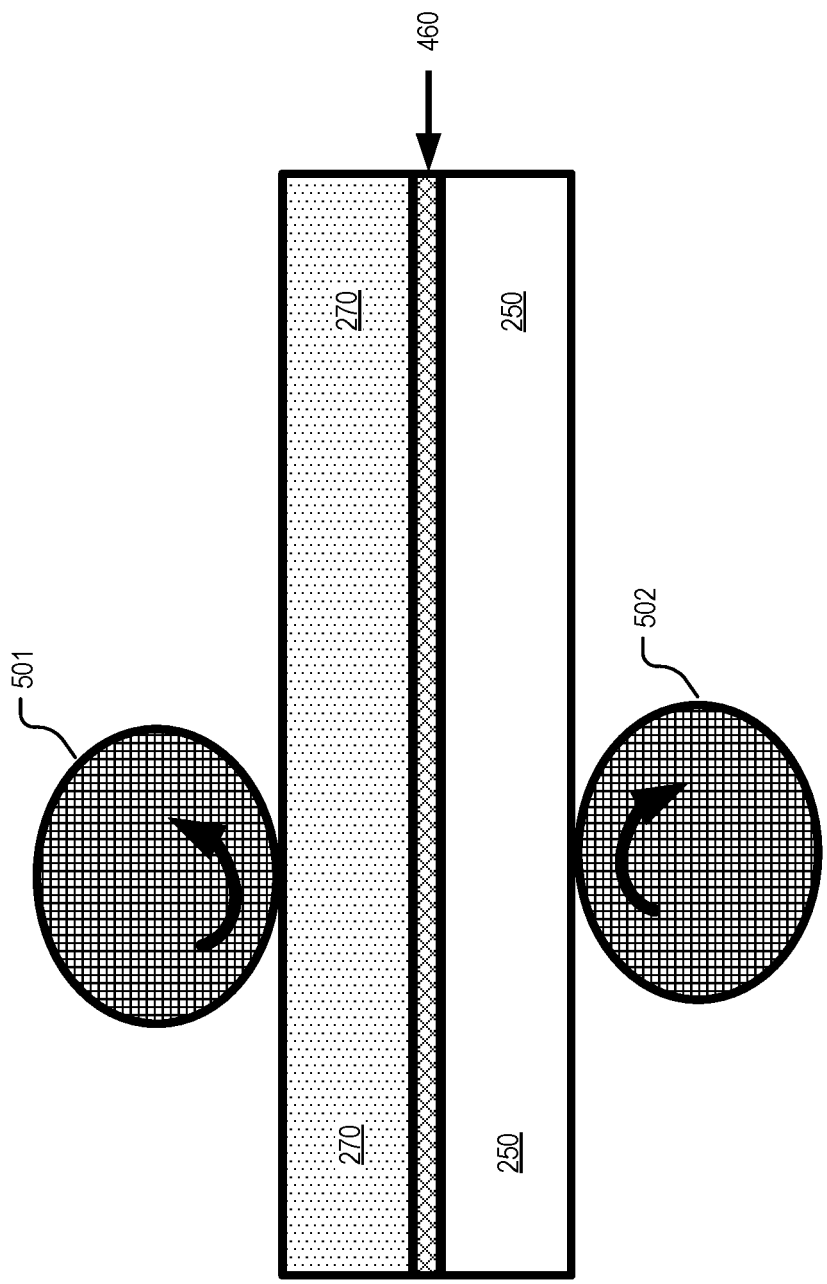
FIG. 5 illustrates an example lamination technique of coupling an optical plastic layer to a glass substrate layer, in accordance with aspects of the disclosure.

FIG. 5 illustrates an example lamination technique of coupling optical plastic layer 270 to glass substrate layer 250, in accordance with aspects of the disclosure. Lamination is one example of fabricating a hybrid plastic-glass blank of the disclosure. In FIG. 5, rolls 501 and 502 rotate to press optical plastic layer 270 onto glass substrate layer to bond optical plastic layer 270 to glass substrate layer 250 with an optically clear adhesive layer 460.

Figure 6:
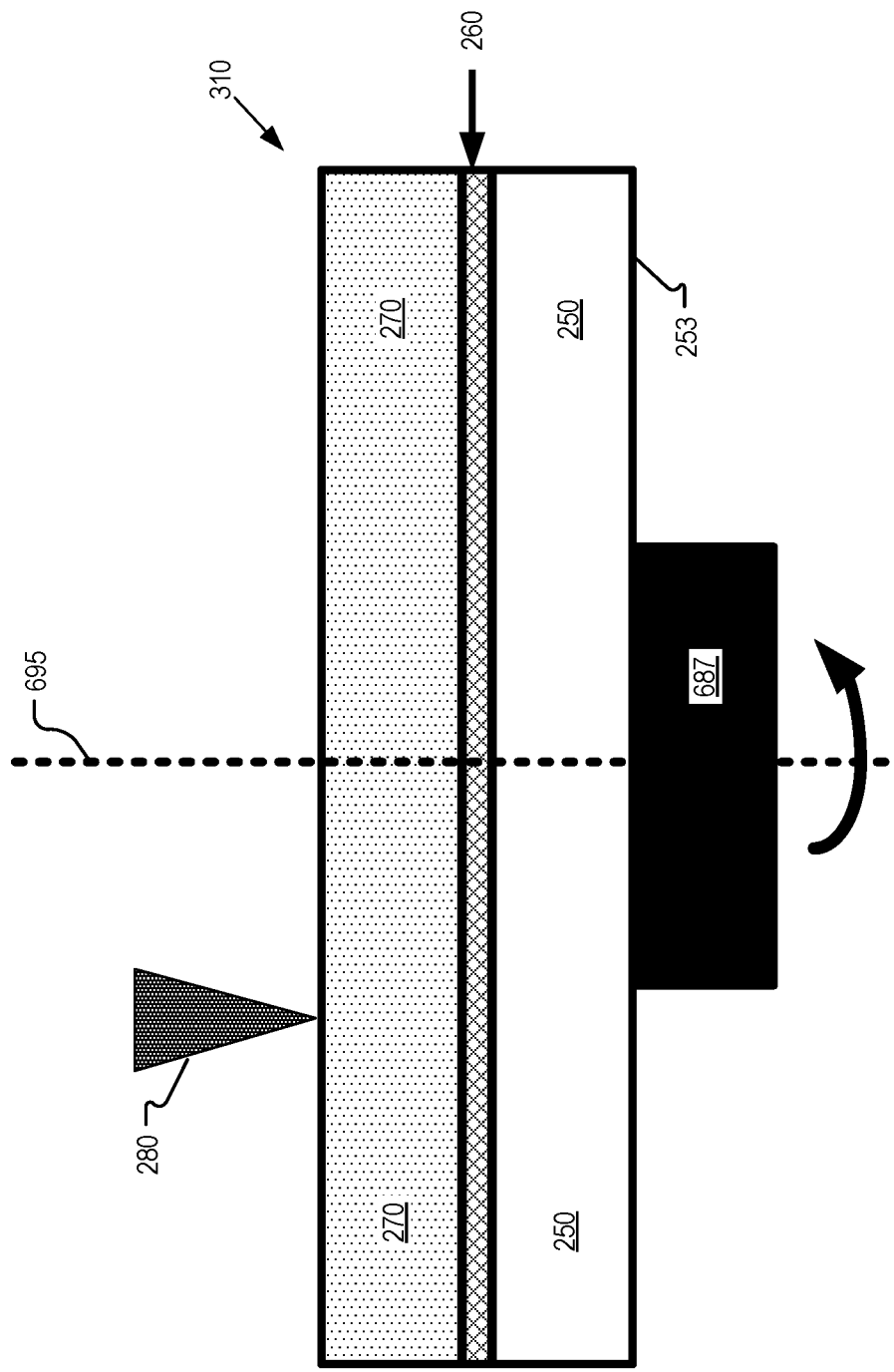
FIG. 6 illustrates a chuck securing a hybrid plastic-glass lens blank for diamond-turning a prescription surface into the optical plastic layer with a diamond bit in a subtractive process, in accordance with aspects of the disclosure.
Figure 7:
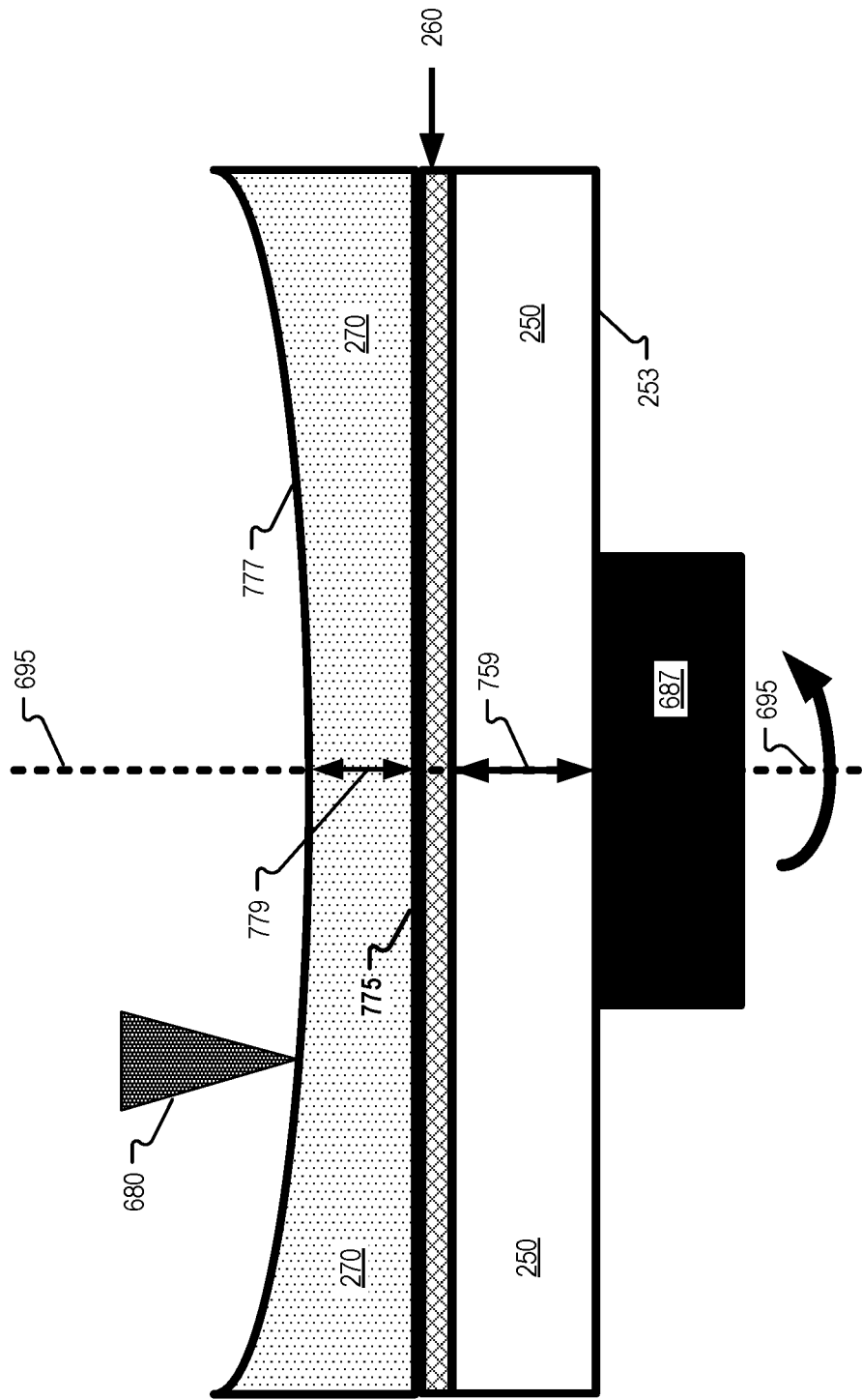
FIG. 7 illustrates a plastic center thickness dimension of an optical plastic layer at a central optical axis of a prescription surface, in accordance with aspects of the disclosure.

FIGS. 6 and 7 illustrate a diamond turning technique of forming a prescription surface 777 in optical plastic layer 270 of a hybrid glass-plastic lens blank, in accordance with an embodiment of the disclosure. Diamond turning, polishing, grinding, etching, or other subtractive process may be deployed to form a prescription surface 777 of FIG. 7. Alternatively, coupling optical plastic layer 270 to glass substrate layer 250 may include casting, injection-molding, or over-molding the optical plastic layer 270 to glass substrate layer 250. In that context, prescription surface 777 may be formed by the mold and curing the optical plastic layer 270 may include curing optical plastic layer 270 with heat or ultraviolet (UV) radiation to form a prescription optical element 711. Prescription optical element 711 may be used as lens 120 in FIG. 1, for example.

FIG. 6 illustrates chuck 687 securing hybrid plastic-glass lens blank 310 for diamond-turning a prescription surface 777 into the optical plastic layer 270 with a diamond bit 280 in a subtractive process. FIG. 7 illustrates a plastic center thickness dimension 779 of optical plastic layer 270 at a central optical axis 695 of the prescription surface 777. Prescription surface 777 is formed opposite planar surface 775 of optical plastic layer 270. In an embodiment, plastic center thickness dimension 779 is less than 200 microns. Dimension 779 may be less than 100 microns, in some embodiments. In an embodiment, dimension 779 is 50 microns or less. Glass substrate layer 250 may have a thickness 759 of 400 microns or less. A total center thickness of prescription lens 711 (e.g. dimension 779 plus dimension 759) may be less than 500 microns. In a conventional plastic lens, a center thickness that is 500 microns or less would not provide suitable rigidity for the prescription lens. However, the hybrid plastic-glass prescription lens 711 has the rigidity characteristic of glass substrate layer 250. This allows prescription lens 711 to be much thinner and lighter than conventional lenses.

Figure 8:
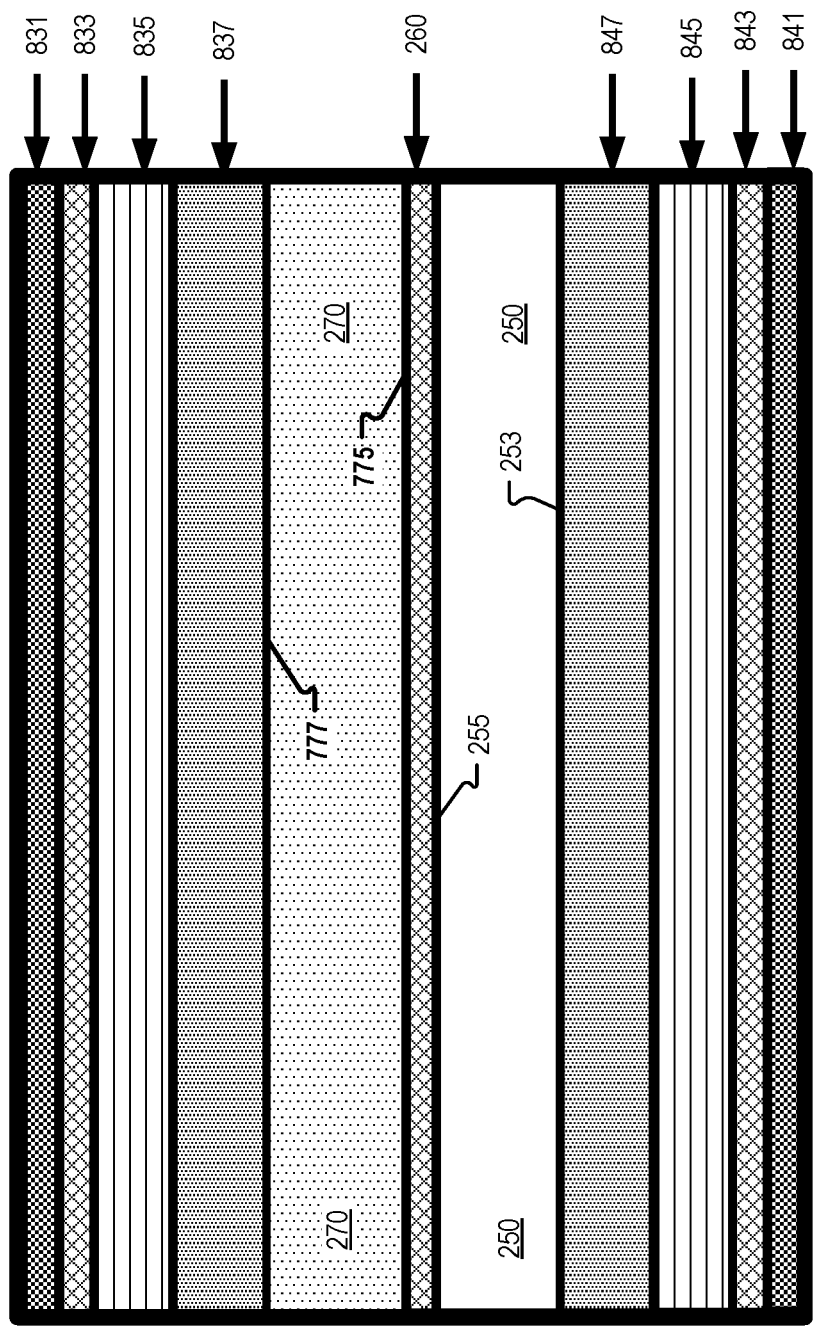
FIG. 8 illustrates an example hybrid glass-plastic prescription optical element, in accordance with aspects of the disclosure.

FIG. 8 illustrates an example hybrid glass-plastic prescription optical element 899, in accordance with an embodiment of the disclosure. FIG. 8 illustrates example optical layers that may be added to a prescription optical element after a prescription surface 777 is formed. Prescription surface 777 is illustrated as planar in FIG. 8 to assist with the description of the additional optical layers, although those skilled in the art appreciate that prescription surface 777 may include a spherical, aspherical, or freeform curvatures. Additionally, the optical layers presented in FIG. 8 are not necessarily drawn to scale.

In FIG. 8, a hard-coat layer 837 is disposed on prescription surface 777. Hard-coat layer 837 may be configured to prevent scratches forming onto prescription surface 777. An anti-reflective (AR) layer 835 may be formed over hard-coat layer 837. The AR layer 835 may be a multi-layer AR layer. An anti-static coating 833 may be formed over AR layer 835 and an anti-fog layer 831 may be disposed over anti-static coating 833.

Similarly, hard-coat layer 847 is disposed on planar surface 253 of glass substrate layer 250. Anti-reflective (AR) layer 845 may be formed under hard-coat layer 847. And, an anti-static coating 843 may be formed under AR layer 845 and an anti-fog layer 841 may be disposed on anti-static coating 843. Other optical layers may optionally be added to optical element 899.

Layers 841, 843, 845, and 847 may be considered plastic layers. In addition to providing anti-scratch, anti-reflective, anti-static, and/or anti-fog attributes, one potential advantage of adding any of layers 841, 843, 845, and 847 may be that a second plastic layer (in addition to plastic layer 270/770) is added beneath glass substrate layer 250. Consequently, glass substrate layer 250 is confined between two plastic layers.

Figure 9:
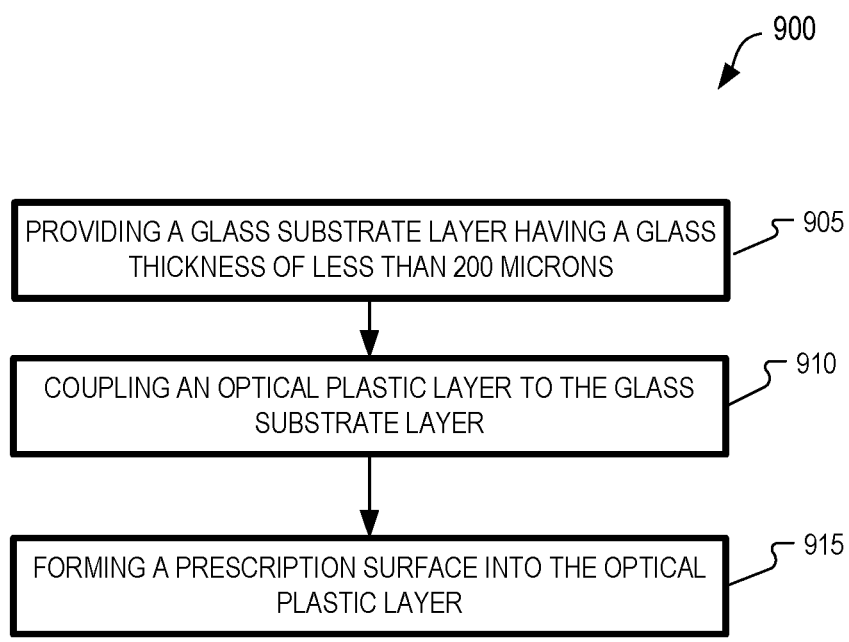
FIG. 9 illustrates a flow chart for an example process of fabricating a prescription optical element, in accordance with aspects of the disclosure.

FIG. 9 illustrates a flow chart for a process of fabricating a prescription optical element, in accordance with aspects of the disclosure. The order in which some or all of the process blocks appear in process 900 should not be deemed limiting. Rather, one of ordinary skill in the art having the benefit of the present disclosure will understand that some of the process blocks may be executed in a variety of orders not illustrated, or even in parallel.

In process block 905, a glass substrate layer (e.g. layer 250) is provided. The glass substrate layer may have a thickness of 400 microns or less.

In process block 910, an optical plastic layer (e.g. optical plastic layer 270 or 770) is coupled to the glass layer.

Coupling the optical plastic layer to the glass substrate layer may include laminating the optical plastic layer to the glass substrate layer. An intermediate layer may adhere the glass substrate layer to the optical plastic layer.

Coupling the optical plastic layer to the glass substrate layer may include roll-to-roll bonding of the optical plastic layer to the glass substrate layer.

Coupling the optical plastic layer to the glass substrate layer may include casting, injection-molding, or over-molding to the optical plastic layer to the glass substrate layer.

Coupling the optical plastic layer to the glass substrate layer may include curing the optical plastic layer with heat or ultraviolet radiation.

In process block 915, a prescription surface is formed into the optical plastic layer. A plastic center thickness of the optical plastic layer may be 200 microns or less after the prescription surface is formed.

Forming the prescription surface may include a subtractive process that includes at least one of grinding, diamond turning, or polishing the optical plastic layer to form the prescription surface of the optical plastic layer.

Process 900 may further include forming a bevel or groove into the prescription optical element to aid in securing the prescription optical element into frames. For example, the prescription optical element may be secured to frame 102 of FIG. 1.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A prescription lens comprising:
   a glass substrate layer;
   a first plastic layer having a planar surface on an object side and a prescription surface on an eyeward side, wherein the planar surface of the plastic layer overlays the glass substrate layer; and
   a second plastic layer, wherein the glass substrate layer provides rigidity to the prescription lens, and the glass substrate layer is disposed between the first plastic layer and second plastic layer and wherein a center thickness of the glass substrate layer and the first plastic layer is less than one millimeter.

2. The prescription lens of claim 1 further comprising:
   an intermediate layer disposed between the first plastic layer and the glass substrate layer, wherein the intermediate layer is an optically clear adhesive (OCA) that adheres the glass substrate layer to the planar surface of the first plastic layer.

3. The prescription lens of claim 2, wherein the intermediate layer is a coefficient of thermal expansion (CTE) absorber layer matched to the glass substrate layer to provide axial flexibility and lateral flexibility of the prescription lens over temperature ranges.

4. The prescription lens of claim 1, wherein a center thickness of the first plastic layer and the glass substrate is less than 500 microns.

5. The prescription lens of claim 4, wherein a glass thickness of the glass substrate layer is less than 400 microns, and wherein a plastic center thickness of the first plastic layer is less than 200 microns.

6. The prescription lens of claim 5, wherein the plastic center thickness of the first plastic layer is less than 50 microns.

7. The prescription lens of claim 1, wherein a first refractive index of the first plastic layer is substantially the same as a second refractive index of the glass substrate layer.

8. An optical element for fabricating a prescription lens, the optical element comprising:
   a glass substrate layer;
   an optical plastic layer having a planar surface facing an object side and a prescription surface disposed on an eyeward side opposite the planar surface; and
   an intermediate layer disposed between the optical plastic layer and the glass substrate layer, wherein the intermediate layer adheres the glass substrate layer to the planar surface of the optical plastic layer, wherein a center thickness of the glass substrate layer and the optical plastic layer is less than one millimeter.

9. The optical element of claim 8, wherein a glass thickness of the glass substrate layer is less than 400 microns, and wherein a plastic center thickness of the optical plastic layer is less than 200 microns.

10. The optical element of claim 9, wherein the plastic center thickness of the optical plastic layer is less than 50 microns.

11. The optical element of claim 8, wherein a first refractive index of the optical plastic layer is substantially the same as a second refractive index of the glass substrate layer.

12. The optical element of claim 8, wherein a bevel or groove is cut into the glass substrate layer or plastic layer to aid securing of the optical element into frames.

* * * * *